3,007,966
METHOD OF REDUCING NITRO-SUBSTITUTED ARYLIDES OF β-HYDROXY CARBOXYLIC ACIDS
William G. Huey, Nassau, N.Y., assignor to General Aniline & Film Corporation, New York, N.Y., a corporation of Delaware
No Drawing. Filed Sept. 4, 1958, Ser. No. 758,881
13 Claims. (Cl. 260—560)

This invention relates to a method of reducing arylides of β-hydroxy carboxylic acids, and relates more particularly to the novel method for the production of compounds of the type

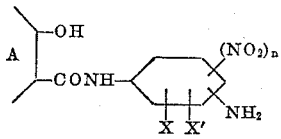

wherein X and X' each represents hydrogen, a lower alkyl radical having at most 4 carbon atoms, a lower alkoxy radical having at most 4 carbon atoms or halogen, $n$ represents an integer of 0–1, and A stands for a Naphthol AS type β-hydroxy carboxylic acid moiety, by a procedure involving the hydrogenation of the corresponding nitro compound.

One method heretofore employed for preparing such compounds is described in U.S. Patent No. 1,101,111 and comprises the condensation of the β-hydroxy carboxylic acid with a phenylene diamine. However, this method gave rise to side reactions so that the product was not obtained in desired yields with a high degree of purity.

Another method for the preparation of such compounds is described in U.S. Patent No. 1,892,480. In accordance with the method of this patent, the β-hydroxy carboxylic acid is reacted with an acyl derivative of a phenylene diamine type compound followed by hydrolysis of the acyl group. This method is relatively complicated since a nitraniline compound must be acylated, reduced, condensed and finally hydrolyzed.

Another method which has been proposed for the production of such compounds is the reduction of the corresponding nitro compound using iron or other metal as the reducing agent. This reaction must be carried out under acid conditions; accordingly, it is unsatisfactory since the β-hydroxy acid arylide used as the starting material is insoluble under acid conditions. Solvents may, of course, be resorted to, but their use introduces complications such as, for example, the need for solvent recovery.

I have now found a highly advantageous direct method of reducing a nitro group substituted in the arylide portion of the β-hydroxy carboxylic acid arylides, wherein the resulting amine derivative is obtained in good yield and quality. According to the method of my invention, the nitro-substituted Naphthol AS compound is dissolved in aqueous alkali and then treated with sodium sulfhydrate (sodium hydrosulfide), potassium hydrosulfide and the like in order to reduce the nitrogroup. After reduction, the solution containing the reduced β-hydroxy carboxylic acid arylide is acidified and cooled to precipitate the reduced arylide. If desired, the charge may be boiled to eliminate any SO₂ and H₂S which may be present. After filtering, the filter cake is slurried with dilute alkali for less than 5 hours and, preferably, less than 1 hour. This latter step is critical since I have found that sulfur under the conditions of this invention does not dissolve in the alkali but that the arylide does. On refiltering and acidifying, the desired arylide is obtained in practically theoretical yield and has an excellent quality and high degree of purity.

The β-hydroxy carboxylic acid moiety may be derived from any of the usual Naphthol AS type acids such as: 3-hydroxy-2-naphthoic acid, 3-hydroxy-2-anthroic acid, 3-hydroxy-2-dibenzofurancarboxylic acid, 2-hydroxy-3-carbazolecarboxylic acid, 2-hydroxy-3-benzocarbazolecarboxylic acid and the like.

The arylide moiety may be derived from such compounds as, for example:

o,m and p-nitroaniline
2,4-dinitroaniline
2,5-dinitroaniline
5-chlor-2-nitroaniline
2,6-dichlor-4-nitroaniline
5-brom-2-nitroaniline
2,6-dibrom-4-nitroaniline
4-nitro-o-toluidine
5-nitro-o-toluidine
4-nitro-m-toluidine
5-nitro-m-toluidine
2-nitro-p-toluidine
2-chloro-5-nitro-p-toluidine
5-nitro-3,4-dimethylaniline
6-nitro-o-anisidine
5-nitro-o-anisidine
5-nitro-m-anisidine
2,5-dimethoxy-4-nitraniline
2,3-dimethyl-5-nitraniline
2-chloro-5-nitro-p-toluidine
5-methyl-4-nitro-o-anisidine.

In carrying out my invention, a molar equivalent of the nitro-substituted arylide is dissolved in aqueous alkali, the degree of alkalinity being such as to dissolve the arylide, i.e. a minimum of an equivalent of alkali per mol of arylide, and the concentration being a workable concentration, i.e. about 0.5 to 3.0%. An excess of sodium sulfhydrate over that required to reduce the base, i.e. about 2.5 mols to about 5 mols per mol of arylide is added. The reaction mixture is heated until reduction has occurred, usually about 2 to 10 hours. The charge is acidified and preferably cooled, the simplest means being to drown it in a mixture of acid, ice and water. Heating at this point is desirable to drive off SO₂ and H₂S, followed by cooling and filtering. The filter cake contains reduced arylide together with sulfur.

I have found that when dilute caustic of about 3 to 10% concentration is stirred with the filter cake, negligible amounts of sulfur are dissolved in the caustic but that the arylide is dissolved therein. For example, treatment of 10 grams of sulfur in 700 cc. of 5% sodium hydroxide solution at ordinary temperatures for 24 hours resulted in 8.0% of the original sulfur being converted to sulfide, whereas for 4 hours treatment only 0.108% of the original sulfur is converted. Hence, it is obvious that treating a sulfur-arylide cake for as long as 4 hours would not dissolve appreciable amounts of sulfur. This allows formation of an alkaline solution of arylide of high purity, free from sulfur. The amount of caustic used is the amount required to dissolve the arylide. As a minimum it would be that amount of solution which contains the amount of caustic to form the sodium salt of the arylide. The filtrate is then acidified (made Congo acid), preferably with some cooling, to precipitate the arylide which is then filtered. Yields are practically quantitative and the quality is high.

My method of reducing the base has one additional advantage in that sodium sulfhydrate is frequently employed for selective hydrogenation of dinitro compounds, and in the event that two nitro groups are present in the arylide, a selective hydrogenation of one may be obtained.

The following examples illustrate my invention in greater detail:

Example 1

31 grams of Naphthol AS-BS (1/10 mol).

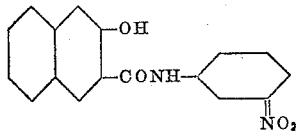

is treated with 310 cc. water and 10 cc. of 30% caustic soda solution. The slurry formed is heated to 90–97° C., and a solution of 24 grams sodium sulfhydrate (NaSH. 1⅓ $H_2O$) in 25 cc. of water is added dropwise and the whole heated for 4 hours. The reaction mixture is drowned slowly into a mixture of 65 cc. of concentrated hydrochloric acid and 250 cc. of ice and water. The mixture is heated for a short time (½ hour) to boil off the $SO_2$ and $H_2S$, filtered and washed with water. The filter cake is then treated with 400 cc. of a 5% solution of sodium hydroxide at room temperature, the slurry formed filtered within 30 minutes and the filtrate then made Congo acid by the addition of hydrochloric acid. The amine-substituted arylide is precipitated and filtered.

The yield is practically quantitative, and the quality excellent.

Example 2

31 grams of Naphthol AS-AN (1/10 mol).

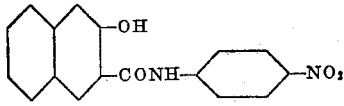

is treated as in Example 1. The results are commensurate.

Example 3

38.2 grams (1/10 mol) of the Naphthol of the formula:

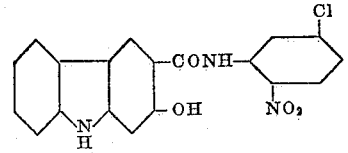

is treated as in Example 1. The results are commensurate.

Example 4

43 grams (1/10 mol) of the Naphthol of the formula:

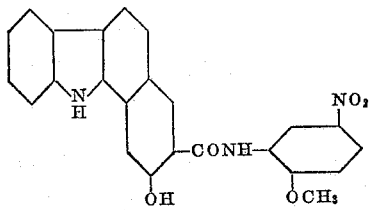

is treated as in Example 1. The results are commensurate.

Example 5

35 grams (1/10 mol) of the Naphthol of the formula:

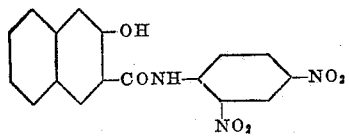

is treated as in Example 1. A good yield is obtained of a selectively hydrogenated product which contains only one free amino group in the arylide nucleus.

The compounds produced in accordance with the process of this invention are very useful intermediates in the dyestuff industry as coupling components with various diazo compounds.

It is to be understood that the foregoing detailed description is given merely by way of illustration and that many variations may be made therein without departing from the spirit of my invention.

I claim:
1. In a process for preparing an amine-substituted anilide or substituted anilide of a β-hydroxy carboxylic acid by the sulfide reduction of a nitro group in the anilide moiety of the β-hydroxy carboxylic acid anilide, the improvement which comprises purifying the amine-substituted anilide of the β-hydroxy carboxylic acid by slurrying the same with dilute alkali solution to solution of β-hydroxy carboxylic acid anilide.

2. In a process for preparing an amine-substituted anilide or substituted anilide of a β-hydroxy carboxylic acid by the sulfide reduction of a nitro group in the anilide moiety of the β-hydroxy carboxylic acid anilide, the improvement which comprises purifying the amine-substituted anilide of the β-hydroxy carboxylic acid by slurrying the same with dilute alkali solution of about 3 to 10% concentration to solution of β-hydroxy carboxylic acid anilide.

3. In a process for preparing an amine-substituted anilide or substituted anilide of a β-hydroxy carboxylic acid by the sulfide reduction of a nitro group in the anilide moiety of the β-hydroxy carboxylic acid anilide, the improvement which comprises purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

4. A method of treating a nitro-substituted anilide or substituted anilide of a β-hydroxy carboxylic acid, which comprises treating a solution of a nitro-substituted anilide of a β-hydroxy carboxylic acid in aqueous alkali with a sulfur-containing compound under such conditions that a nitro group of the anilide moiety of the β-hydroxy carboxylic acid anilide is reduced to an amine group, precipitating the reduced anilide from the solution, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

5. A method of treating a nitro-substituted anilide or substituted anilide of a β-hydroxy carboxylic acid, which comprises treating a solution of a nitro-substituted anilide of a β-hydroxy carboxylic acid in aqueous alkali with sodium sulfhydrate under such conditions that a nitro group of the anilide moiety of the β-hydroxy carboxylic acid anilide is reduced to an amine group, precipitating the reduced anilide from the solution, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

6. A method of treating a nitro-substituted anilide or substituted anilide of a β-hydroxy carboxylic acid, which comprises treating a solution of a nitro-substituted anilide of a β-hydroxy carboxylic acid in aqueous alkali with sodium sulfhydrate at a temperature of 90 to 97° C. for from 2 to 10 hours whereby a nitro group of the anilide moiety of the β-hydroxy carboxylic acid anilide is reduced to an amine group, precipitating the reduced anilide from the solution, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

7. A method of treating a nitro-substituted anilide or substituted anilide of a β-hydroxy carboxylic acid, which comprises treating a solution of a nitro-substituted anilide of a β-hydroxy carboxylic acid in aqueous alkali with an excess of sodium sulfhydrate at a temperature of 90 to 97° C. for from 2 to 10 hours whereby a nitro group of the anilide moiety of the β-hydroxy carboxylic acid anilide is reduced to an amine group, precipitating the reduced anilide from the solution, heating the mixture formed to drive off sulfur dioxide and hydrogen sulfide, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

8. A method of treating a compound of the formula

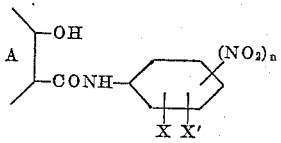

wherein X and X' represents a radical selected from the group consisting of hydrogen, lower alkyl, lower alkoxy and halogen, A represents a β-hydroxy carboxylic acid anilide moiety and $n$ represents an integer of 1–2, which comprises forming a solution of said compound in aqueous alkali, treating said solution with a reducing agent under such conditions that a nitro group of the anilide moiety of the β-hydroxy carboxylic acid anilide is reduced to an amine group, precipitating the reduced anilide from the solution, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

9. A method of treating a compound of the formula

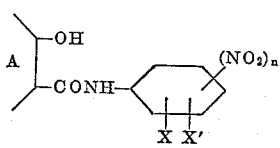

wherein X and X' each represents a radical selected from the group consisting of hydrogen, lower alkyl, lower alkoxy and halogen, A represents a β-hydroxy carboxylic acid anilide moiety, and $n$ represents an integer of 1–2, which comprises forming a solution of said compound in aqueous alkali, treating said solution with sodium sulfhydrate under such conditions that a nitro group of the anilide moiety of the β-hydroxy carboxylic acid anilide is reduced to an amine group, precipitating the reduced anilide from the solution, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

10. A method of treating a compound of the formula

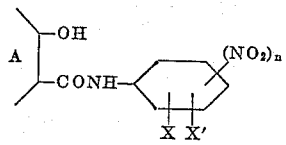

wherein X and X' each represents a radical selected from the group consisting of hydrogen, lower alkyl, lower alkoxy and halogen, A represents a β-hydroxy carboxylic acid anilide moiety, and $n$ represents an integer of 1–2, which comprises forming a solution of said compound in aqueous alkali, treating said solution with sodium sulfhydrate at 90 to 97° C. for from 2 to 10 hours whereby a nitro group of the anilide moiety of the β-hydroxy carboxylic acid anilide is reduced to an amine group, precipitating the reduced anilide from the solution, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

11. A method of treating a compound of the formula

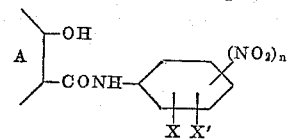

wherein X and X' represents a radical selected from the group consisting of hydrogen, lower alkyl, lower alkoxy and halogen, A represents a β-hydroxy carboxylic acid anilide moiety, and $n$ represents an integer of 1–2, which comprises forming a solution of said compound in aqueous alkali, treating said solution with an excess of sodium sulfhydrate at an elevated temperature for from 2 to 10 hours whereby a nitro group of the anilide moiety of the β-hydroxy carboxylic acid anilide is reduced to an amine group, precipitating the reduced anilide from the solution, filtering the reduced anilide, and then purifying the amine-substituted anilide of the β-hydroxy carboxylic acid by slurrying the same with dilute alkali solution of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

12. A method of treating a compound of the formula

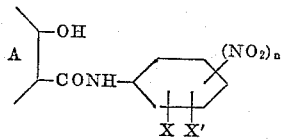

wherein X and X' each represents a radical selected from the group consisting of hydrogen, lower alkyl, lower alkoxy and halogen, A represents a β-hydroxy carboxylic acid anilide moiety, and $n$ represents an integer of 1–2, which comprises forming a solution of said compound in aqueous alkali, treating said solution with an excess of sodium sulfhydrate at 90 to 97° C. for from 2 to 10 hours whereby a nitro group of the anilide moiety of the β-hydroxy carboxylic acid anilide is reduced to an amine group, precipitating the reduced anilide from the solution, heating the mixture formed to drive off sulfur dioxide and hydrogen sulfide, filtering the reduced anilide, and then purifying the amine-substituting anilide of the β-hydroxy carboxylic acid by slurrying the same with dilute aqueous solution of sodium hydroxide of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

13. A method of treating a compound of the formula

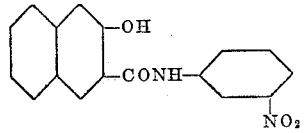

which comprises forming a solution of said compound in 0.5–3.0% aqueous sodium hydroxide, treating said solution with aqueous sodium sulfhydrate and heating the reaction mixture for 2–10 hours, whereby a nitro group of the anilide moiety of the β-hydroxy carboxylic acid anilide is reduced to an amine group, precipitating the reduced anilide from the solution by the addition of hydrochloric acid thereto, heating the mixture formed to drive off sulfur dioxide and hydrogen sulfide, filtering the reduced anilide, and then purifying the amine-substituted anilide of the β-hydroxy carboxylic acid by slurrying the same with dilute aqueous solution of sodium hydroxide of about 3 to 10% concentration to solution of β-hydroxy carboxylic acid anilide, filtering the slurry formed and precipitating the so-treated β-hydroxy carboxylic acid anilide from the filtrate whereby the said anilide is substantially free from sulfur.

References Cited in the file of this patent

UNITED STATES PATENTS

| | | |
|---|---|---|
| 714,428 | Wirth | Nov. 25, 1902 |
| 1,669,764 | Knecht | May 15, 1928 |
| 1,689,014 | Dieterle | Oct. 23, 1928 |
| 1,890,202 | Tinker et al. | Dec. 6, 1932 |
| 1,892,480 | Bonhote | Dec. 27, 1932 |
| 2,022,579 | Turski | Nov. 26, 1935 |
| 2,157,797 | Muth | May 9, 1939 |
| 2,393,723 | Tullar | Jan. 29, 1946 |
| 2,649,353 | Streck | Aug. 18, 1953 |

FOREIGN PATENTS

| | | |
|---|---|---|
| 424,217 | Germany | Jan. 27, 1926 |
| 154,172 | Switzerland | Apr. 30, 1932 |
| 156,654 | Switzerland | Aug. 15, 1932 |